Jan. 11, 1927. 1,614,135
O. LASCHE ET AL
METHOD AND MEANS FOR THE PURIFICATION OF WATER
Filed Oct. 13, 1923
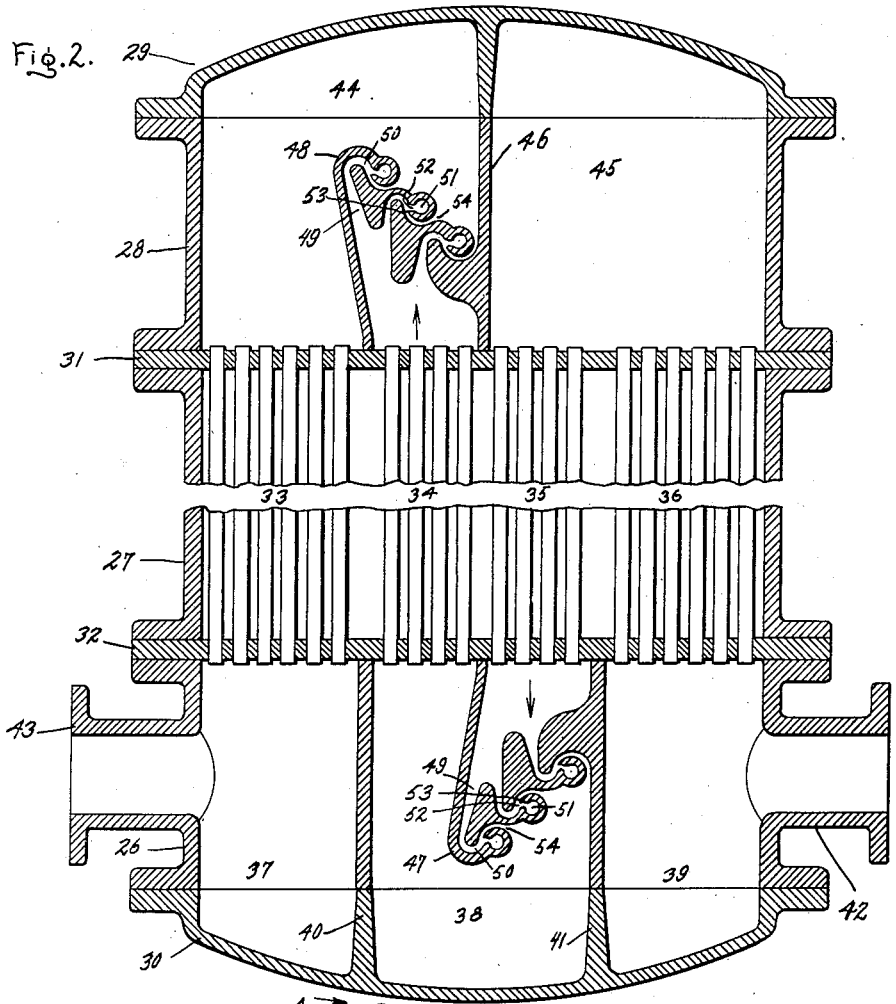
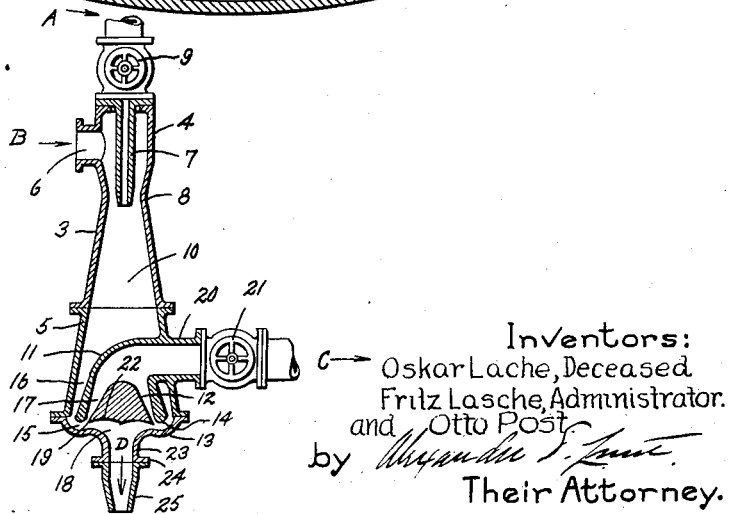
Inventors:
Oskar Lache, Deceased
Fritz Lasche, Administrator.
and Otto Post
by
Their Attorney.

Patented Jan. 11, 1927.

1,614,135

UNITED STATES PATENT OFFICE.

OSKAR LASCHE, DECEASED, LATE OF WESTEND, GERMANY; BY FRITZ LASCHE, ADMINISTRATOR, OF DRESDEN, GERMANY; AND OTTO T. POST, OF CHARLOTTENBURG, GERMANY, ASSIGNORS TO GENERAL ELECTRIC COMPANY, A CORPORATION OF NEW YORK.

METHOD AND MEANS FOR THE PURIFICATION OF WATER.

Application filed October 13, 1923, Serial No. 668,397, and in Germany October 14, 1922.

This invention relates to a method and means for the purification of water and other fluids and more particularly it relates to a method and means for the removal from water of suspended impurities or those impurities which precipitate on heating, whereby water containing such impurities, for example, river water, may be used without harmful results as a supply source for the water tubes and pipes of heating apparatus and the like.

It is well known that when impure water is conducted through tubes and pipes in which it becomes heated such as, for example, the water tubes of boilers and surface condensers, certain mineral and biological matter present in it in varying quantities and ordinarily actually or in effect solvent at low temperatures, precipitate or separate out of solution because of the heating and form a rapidly growing deposit or scale on the walls of such tubes and pipes. This deposit then develops into a dangerous obstruction unless it is frequently removed or prevented from forming.

According to present methods, such deposits are removed by mechanical means involving taking the apparatus to be cleaned, out of service, together with considerable expense for power and labor, or they are prevented from forming less rapidly at least by treating the water chemically before it enters the tubes. The chemical treatments, however, introduce other undesirable products and require care and attention in addition to the expense of the chemicals used.

It is the object of this invention to provide an improved method and means for the purification of water which will be efficient, economical and require in itself no attention, and which among other things will take advantage of the fact that certain scale forming impurities precipitate out of solution when heated.

For a consideration of what is believed to be novel and the invention, attention is directed to the accompanying drawing, description thereof and the appended claims.

In the drawing, Fig. 1 is a sectional side view of an ejector feed water heater of the ordinary type provided with water purification means in accordance with the invention, and Fig. 2 is a sectional side view of a surface condenser embodying a modification.

Referring to Fig. 1, 3 is a cone-shaped casing of an ejector type of feed water heater, having an enlarged cylindrical inlet head 4 integral therewith and a separable frustroconoidal receiving casing 5. Steam, and the water to be heated, as indicated by the arrows A and B respectively, enter the casing through head 4, a side inlet opening 6 being provided for the water, and a nozzle 7 for the steam being inserted through the top and arranged to discharge within the casing centrally thereof and at a point below a Venturi neck 8 formed by the junction of the casing 3 with the head 4. A valve 9 is provided between the nozzle 7 and the steam supply.

The water forced into the casing through inlet 6 is given an increase in velocity on passing through the Venturi neck 8 and as the steam is injected through nozzle 7 at a high rate, a thorough mixing and heating results in a mixing chamber 10, which the lower end of casing 3 and the adjoining upper end of casing 5 jointly provide.

If the usual outlet is provided from the mixing chamber 10 through which the heated feed water might pass directly to apparatus requiring the heated supply, for, example, the water tubes of a steam boiler, the separation of impurities effected by the heating will occur in such apparatus with harmful results, as has been previously pointed out. This is, in accordance with the invention, prevented from occurring in such apparatus and made to occur in a stationary centrifugal separator of proper structure located between the feed water heater and the apparatus supplied by it. In certain cases, and as in the present example, the centrifugal separator may be incorporated in the feed water heater structure itself for greater economy and simplicity in manufacture and to receive the fullest benefit from the temperature and velocity attained by the water in the heater.

Thus, in accordance with the invention a centrifugal separator is positioned in the lower end of receiving casing 5. This comprises an outer shell 11 in the form of an inverted cup, a conical deflector member 12 within the shell and a cover plate 13 fitted over the lower end of receiving casing 5. The cup-shaped outer shell 11 is concentrically positioned within the casing 5 and is provided with a thickened and rounded lower edge 14. The cover 13 is shaped to cooperate with the edge 14 in forming an annular radially-curved passage 15 which is in turn connected with the mixing chamber 10 by an annular converging passage 16 formed between the outer wall of shell 11 and the inner wall of casing 5.

The original velocity of the steam and water, partially utilized in the mixing effected in chamber 10, is restored and increased to a higher value as the mixture discharges through the converging passage 16 and into the curved passage 15. The substantially right-angled change in direction which the rapidly moving mixture undergoes in this last-named passage effects a centrifugal separation between the heavier and the lighter portions of the stream with the result that suspended impurities, together with those precipitated by the heating in chamber 10, are thrown into a lower or outer zone and against the cover plate 13, while the remainder or purified portion forms the upper or inner zone adjacent the curved edge 14 of shell 11. Gravity assists in the separating action in that the centrifugal forces causing separation are provided to act downwardly, and this together with the fact that a large area of the stream is acted upon at once because of the annular form of the passage 15, gives the separator a high capacity rating for a given size.

Final separation between the purified feed water and the impurities, that is, between the upper and lower zones respectively of the fluid stream in passage 15, is completed by positioning the conical deflecting member 12 concentrically within the shell 11 so that it forms the inner wall of two annular passages 17 and 18 leading from the discharge side of the separating passage 15 and so that a sharpened base edge 19 with which it is provided meets the stream issuing from said last-named passage between said upper and lower zones.

The purified feed water is deflected by edge 19 into passage 17 and is there directed between the wall of shell 11 and the deflector 12 to a side outlet orifice 20 from which it passes through a valve 21 to any apparatus in which it is to be used, for example, a boiler. The outlet orifice 20 is formed integrally with the casing 5 and the shell 11, which construction simplifies manufacture and precludes leakage between the impure and purified feed water by obviating the need for packed joints.

The impurities are deflected into passage 18 and are directed between the face of an annular stream-line-forming recess 22 in the base of deflector 12 and the opposite curved wall of the cover plate 13, which together form the walls of this passage, to a centrally located outlet orifice 23 in the cover plate. This orifice is provided with an external flange 24 to which any suitable receiving system for the impurities may be connected. In the present example it is fitted with a flanged discharge nozzle 25 through which the impurities are directed into a drain gutter (not shown). Arrows C and D serve to indicate the flow from the separator of the pure feed water and the separated impurities respectively.

The passages 17 and 18 are preferably made diverging in the direction of flow as shown to permit the velocity of the stream, especially in the feed water outlet to fall to normal, that is, to the value at which it entered at inlet 6.

In certain cases it is highly desirable that apparatus embodying the invention for the separation of impurities from liquids may as well be adapted to the separation of solids from gases. Thus, under certain operating conditions it may be desirable to deliver dry steam instead of heated feed water from the outlet orifice 20, in which case the feed water would be cut off from the inlet 6. The steam entering nozzle 7 in the usual manner then passes through the separating passage 15 with the same result as before. The heavier portions of the stream will be separated at the edge 19 of the deflector member and pass out the discharge orifice 23, while the lighter portions will be delivered at the orifice 20, that is, any water present in the steam will be thrown to the outer zone in passage 15 and removed in the same manner as are the heavier precipitated impurities from the feed water. Thus, the invention provides for the separation of impurities from fluids as well as from liquids.

It will be understood that as many steam operated ejector heaters and integral separators may be inserted in a conduit through which an impure fluid flows as is necessary to completely remove the last trace of heat precipitating impurities, although in most cases, as assumed in the present example, one heater and one separator are sufficient. In this connection any form of heater may be employed which will increase the temperature of the fluid to a degree which will insure precipitation of the impurities. The steam operated ejector type shown is desirable in that it imparts a velocity to the water along with the heating.

Referring now to Fig. 2, a further embodiment of the invention is presented in connection with a surface condenser. This condenser is shown, by way of example, as the ordinary sectional, built-up type, comprising a series of symmetrical casings 26, 27 and 28 of uniform diameter, each provided with flanged ends and secured one on the other to form a unitary structure. The ends of the unit are closed by top and bottom end caps 29 and 30 respectively, and fitted between the adjacent flanged ends of the casings and providing dividing walls between their interiors are two partition plates 31 and 32. These plates further serve to support a series of grouped parallel, cooling pipes 33, 34, 35 and 36 arranged longitudinally of and within the center casing 27 and secured at their ends in said plates. The pipes are open ended and project through the plates 31 and 32 sufficiently to provide a water circulating connection between the end casings 26 and 28.

The interior of the lower casing 26 is divided into three compartments 37, 38 and 39 by two chordal, parallel, partitioning webs 40 and 41, each formed integrally with the casing and its end cap 30 and each divided along the dividing line between the casing and said cap. These partition-forming webs are spaced apart so that web 40 will lie between the ends of cooling pipe groups 33 and 34 and so that web 41 will lie between the ends of cooling pipe groups 35 and 36, each web footing against the plate 32 to form a watertight connection therewith. A flanged cooling water inlet orifice 42 opens into compartment 39, being formed integrally with the casing 26 and on the opposite side of this casing a similar cooling water outlet orifice 43 is provided in connection with compartment 37.

The interior of the upper casing 28 is divided into two equal compartments 44 and 45 by a single partitioning web 46 which is like those in the lower casing except that it lies in a diameter line of the upper casing instead of along a chord and meets the plate 31 between the ends of cooling pipe groups 34 and 35. It is, as indicated, in a plane parallel with the partitions 40 and 41.

The partitioning webs 40, 41 and 46 and the compartments 37, 38, 39, 44 and 45 formed by them are provided to direct the cooling water to pass successively through the groups of cooling water pipes in the casing 27, and to thus effect a more complete heat exchange between the cooling water and steam or other vapors to be condensed in casing 27. That is, the cooling water entering at 42 is made by said partitioning webs to pass upwardly through pipes 36, then downwardly through pipes 34 and 35, upwardly again through pipes 34 and 35, upwardly again through pipes 33 to the finally downwardly through pipes 33 to the outlet 43, thus passing through the casing 27 four times and becoming highly heated in condensing the steam or other vapors which may be supplied to casing 27, and for which any suitable inlet and outlet openings, not shown, may be provided.

Under conditions which make it necessary to use impure water for cooling purposes, the heating which it receives in the cooling pipes will cause the impurities to separate out of solution and deposit as a scale on the hot walls of these pipes especially in the third and fourth groups and only by frequent cleaning can these pipes be prevented from clogging.

Now according to the invention, means are provided whereby the impurities may be removed before they are given an opportunity to form a scale on the pipe walls. In the present example the means provided takes the form of a pair of stationary centrifugal separators 47 and 48 which are formed integrally with webs 41 and 46 respectively as covers for the discharge ends of pipes 35 and 34. Scale forming impurities, separated and made active by the heating, are removed in passing through a number of velocity producing nozzles 49 and sharply curved direction changing passages 50 with which each of the separators is provided in sufficient numbers to carry the normal flow through the condenser. The substantially 180 degree change in direction which the stream undergoes in passages 50 effects a centrifugal separation between its heavier and lighter portions, that is, between the suspended and heat precipitated impurities and the fluid portions, and forms the stream into an outer zone of impurities adjacent the outer wall of passages 50 and a purified zone adjacent the inner wall of passages 50.

Integrally formed with this nozzle and passage structure and arranged to form an end portion of the outer wall of each curved passage 50 are a number of lateral discharge conduits 51 leading exteriorly of the separator and of the condenser. These are connected with the outer zone of impurities by slots 52 opening into them tangentially from the passages 50. One edge 53 of each of these slots forms in each of said passages a sharp separating means between the pure and impure zones. These edges effectively skim the stream of the impurities and direct the same into the outlet conduits 51 provided to conduct them from the condenser. The inner zone of purified cooling water is permitted to follow the regular path through the condenser, passing through widened outlet nozzles 54 provided in continuation of passages 50 into the compartment in which the separator is located and thence to the next set of cooling water pipes.

If further separation of impurities results from the further heating it receives in this next set of cooling water pipes and the cooling water is to pass through another and succeeding set of pipes in which the impurities would lodge, a separator is positioned at the discharge ends of this next set of cooling water pipes, as in the present example, separator 48 follows separator 47, being placed over the ends of pipes 35.

It is obvious that separators like 47 and 48 may also be placed over the discharge ends of pipes 36 and 33, but it is believed to be unnecessary in the condenser of the present example as the cooling water is not dangerously heated in the first set of pipes 36 of such a condenser and the last set of pipes 33 discharge to the outlet 43. However, if a second condenser is to be connected to the outlet 43 and the cooling water is found to give up further scale forming impurities even after passing through separators 47 and 48, a third separator like the first two, might be placed in a similar manner over the discharge ends of pipes 33 in compartment 37.

In both of the applications of the invention herein described and illustrated, it should be noted that a heating unit such as the steam ejector heater or the water tubes of the condenser, is followed by a stationary centrifugal separator. This is in accordance with the invention in that it provides for the removal of impurities as soon as they separate out of solution and that within the separator itself a velocity is imparted to the stream which will insure a centrifugal action and at the same time prevent scale formation within itself.

In many cases the means for effecting a purification of water or other fluids in accordance with the invention may be applied to existing apparatus without change, while in others slight modifications of the apparatus may be required to carry out the method in accordance with the invention. In any case, it is highly desirable, as shown by the examples given, to incorporate the means embodying the invention directly in the apparatus with which it is used, for economy in manufacture and in operation.

In accordance with the provisions of the patent statutes, we have described the principle of operation of the invention, together with the apparatus which is now considered to represent the best embodiment thereof; but we desire to have it understood that the apparatus shown is only illustrative, and that the invention may be carried out by other means.

What is claimed as new and desired to be secured by Letters Patent of the United States, is:—

1. The combination with a heat exchange apparatus having a plurality of heating stages arranged in series relation to form a fluid conduit, of separating means interposed between certain of said stages, each of said means comprising a velocity increasing passage, a direction changing passage, a wall having a sharp edge forming in said last-named passage a separating means between certain zones of fluid flow in said passage, a discharge conduit, and a slot in said wall associated with said edge and connecting the direction changing passage with the discharge conduit.

2. The combination with a conduit system in which a fluid flows and in which are a plurality of fluid heating sections, of means for removing from said fluid impurities which precipitate because of the heating and tend to form a scale deposit in said system, comprising velocity increasing passages and direction changing passages positioned in the conduit system between certain of said heating sections, said velocity increasing passages discharging directly into said direction changing passages whereby is effected a centrifugal separation of impurities precipitated by the heating by reason of a change in direction of flow at a high velocity in said last-named passages, and means positioned in the conduit system at the discharge ends of said direction changing passages for receiving and removing from the fluid stream the centrifugally separated impurities.

3. The combination with a heating device for a fluid comprising a casing and a heating conduit through which the fluid flows within the casing, of means for preventing scale formations within the conduit by heat precipitated impurities, said means comprising stationary centrifugal separators interposed in said conduit at intervals along its length, whereby said separators form a part of said conduit, and a discharge conduit for separated impurities from each separator leading exteriorly of the casing.

4. In a heating device, the combination with a series of heated conduit sections, of stationary centrifugal separators interposed between said sections and forming therewith a continuous conduit for a fluid stream, each of said separators comprising means for increasing the velocity of flow of the fluid stream, means which utilizes said increased velocity for subjecting the fluid stream to centrifugal force, and separating means which directs a portion of said stream while acted upon by centrifugal force exteriorly of the separator.

5. The method for the purification of cooling water in a surface condenser whereby the formation of scale is prevented, which comprises forcing the cooling water through the condenser in a series of stages wherein it is heated, subjecting the heated water to an increase in velocity and a change in direction of flow between certain of the stages and separating impurities therefrom by skimming the resulting outer zone immediately following each change of direction of flow.

In witness whereof, we have hereunto set out hands and seals this 22nd day of September 1923.

FRITZ LASCHE,
*Administrator of Oskar Lasche, Deceased.*
OTTO T. POST.